United States Patent
Toss

[11] 3,796,021
[45] Mar. 12, 1974

[54] BAG MAKING AND FILLING APPARATUS

[75] Inventor: Franco Toss, Alten-Buseck, Germany

[73] Assignee: Hamac-Hansella GmbH, Viersen, Germany

[22] Filed: June 30, 1972

[21] Appl. No.: 267,940

[30] Foreign Application Priority Data
July 10, 1971 Germany............................ 2134475

[52] U.S. Cl. ................................................ 53/182
[51] Int. Cl.......................... B65b 9/12, B65b 51/30
[58] Field of Search ...... 53/180, 182; 156/218, 466; 93/82

[56] References Cited
UNITED STATES PATENTS

| | | | |
|---|---|---|---|
| 3,011,934 | 12/1961 | Bursak | 53/180 X |
| 3,173,233 | 3/1965 | Klein | 53/182 |
| 3,557,525 | 1/1971 | Bauder | 53/180 |
| 3,530,642 | 9/1970 | Leimert | 53/180 |
| 3,526,079 | 9/1970 | Maxeiner et al. | 53/180 |
| 3,163,971 | 1/1965 | Loliger et al. | 53/180 X |
| 3,149,981 | 9/1964 | Sanni | 53/180 |
| 3,350,840 | 11/1967 | Grafingholt | 53/180 |
| 3,027,696 | 4/1962 | Leasure | 53/182 X |
| 3,091,902 | 6/1963 | Reinhardt | 53/180 X |

Primary Examiner—Travis S. McGehee
Assistant Examiner—John Sipos
Attorney, Agent, or Firm—Michael S. Striker

[57] ABSTRACT

A bag making and filling apparatus wherein a web of weldable material is draped around an upright filling mandrel and is provided with a vertical seam to form a tube. The tube is moved downwardly by means of intermittently driven belt or roller conveyors which are adjacent to the outer side of the mandrel. A carriage below the conveyors supports two welding electrodes which are movable toward each other to provide the tube with a pair of transverse seams one of which constitutes the top seam of the preceding or lower bag and the other of which constitutes the bottom seam of the next-following bag. The carriage is moved downwardly during the intervals of idleness of the conveyors so that the tube is advanced alternately by the conveyors and by the electrodes. The electrodes sever the tube between the transverse seams of a freshly formed pair of seams and move apart when the carriage reaches the lower end of its downward stroke. The carriage is thereupon moved upwardly back to a starting position. The length of strokes of the carriage is adjustable and the mandrel admits a metered quantity of flowable material into the sealed lower end of the tube while the tube is moved by the electrodes and/or by the conveyors.

12 Claims, 2 Drawing Figures

BAG MAKING AND FILLING APPARATUS

BACKGROUND OF THE INVENTION

The present invention relates to bag making and filling apparatus in general, and more particularly to improvements in apparatus for making and filling bags which consist at least in part of synthetic thermoplastic or other suitable weldable or heat-sealable material.

It is already known to drape a web of weldable material around a filling mandrel and to convert the thus draped web into a tube which is provided with longitudinally spaced transverse seams to be converted into a series of bags. The bags are filled by way of the mandrel prior to sealing of those ends which are nearer to the material-discharging end of the mandrel. The tube is transported lengthwise exclusively by tongs containing or supporting welding electrodes which engage the tube and form the latter with a seam during movement of the tongs away from the mandrel. A drawback of such apparatus is that, as a result of pull which is exerted by the tongs, the tube portion immediately behind the rearmost seam is converted into a wedge-shaped body with attendant reduction of its volume so that the bags cannot be filled to capacity. Furthermore, the stroke of the tongs cannot be increased at will because the electrodes would be likely to overheat the adjacent portions of the tube so that the apparatus cannot be used for the making of bags whose length varies within a wide range. Still further, the output of such apparatus is relatively low because the tube remains at a standstill during the relatively long intervals of return movement of reciprocatory tongs to a starting position.

It is further known to transport the tube lengthwise by resorting to belt or roller conveyors which are driven intermittently to advance the tube by the length of a bag prior to movement of electrodes into sealing engagement with the tube at a predetermined distance from the mandrel. A drawback of such apparatus is that their output is relatively low because the formation of transverse seams takes place while the tube is at a standstill so that the making of a bag takes up an interval of stepwise transport of the tube and an interval which is needed to provide the tube with a transverse seam.

SUMMARY OF THE INVENTION

An object of the invention is to provide a bag making and filling apparatus which embodies the advantages but avoides the drawbacks of conventional apparatus.

Another object of the invention is to provide a bag making and filling apparatus which is capable of producing and sealing bags having any desired practical length, wherein each freshly formed bag can be filled to capacity, and wherein the making of transverse seams takes place while the tube is in motion.

A further object of the invention is to provide a bag making apparatus with reciprocable gripping and sealing jaws and wherein the tube can be moved lengthwise while the jaws are disengaged from the tube and are being returned to their starting positions.

An additional object of the invention is to provide a bag making and sealing apparatus with novel and improved drive means for its moving parts and with novel and improved adjusting means which renders it possible to vary the length of bags within a wide range.

Still another object of the invention is to provide a bag making and filling apparatus which is capable of forming each bag with sturdy and reliable lateral and end seams.

The apparatus of the present invention is utilized for the forming and filling of bags which consist at least in part of weldable or heat-sealable material, such as a web of synthetic thermoplastic material or a web at least one side of which is coated with weldable material. The apparatus comprises an elongated mandrel which is preferably mounted in a substantially upright position and may constitute the hollow tubular outlet of a device for introducing into successive bags measured quantities of a flowable (e.g., liquid and/or comminuted solid) material, means for supplying to the mandrel a web of weldable material and for converting the web into a tube which surrounds the mandrel (the tube can be formed upstream of the mandrel or by draping the web directly around the mandrel and by welding the overlapping marginal portions of the draped web to each other by means of an electrode which is adjacent to the external surface of the mandrel), and combined welding and transporting means which includes conveyor means outwardly adjacent to the mandrel and operative to transport the tube lengthwise of the mandrel in a predetermined direction (preferably downwardly) and in stepwise fashion with an interval of predetermined duration between each pair of successive lengthwise movements of the tube under the action of the conveyor means, a plurality of welding elements (e.g., heated electrodes) which are movable toward and away from each other transversely of the tube to provide the tube with at least one transverse seam in response to movement toward each other (whereby the tube portion between two successive seams or groups of seams constitutes a sealed bag which can be separated from the tube upon completed movement of welding elements in the predetermined direction), and means for moving the welding elements in the predetermined direction during each of the aforementioned intervals and while the welding elements engage the tube so that the latter shares such movements of the welding elements.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
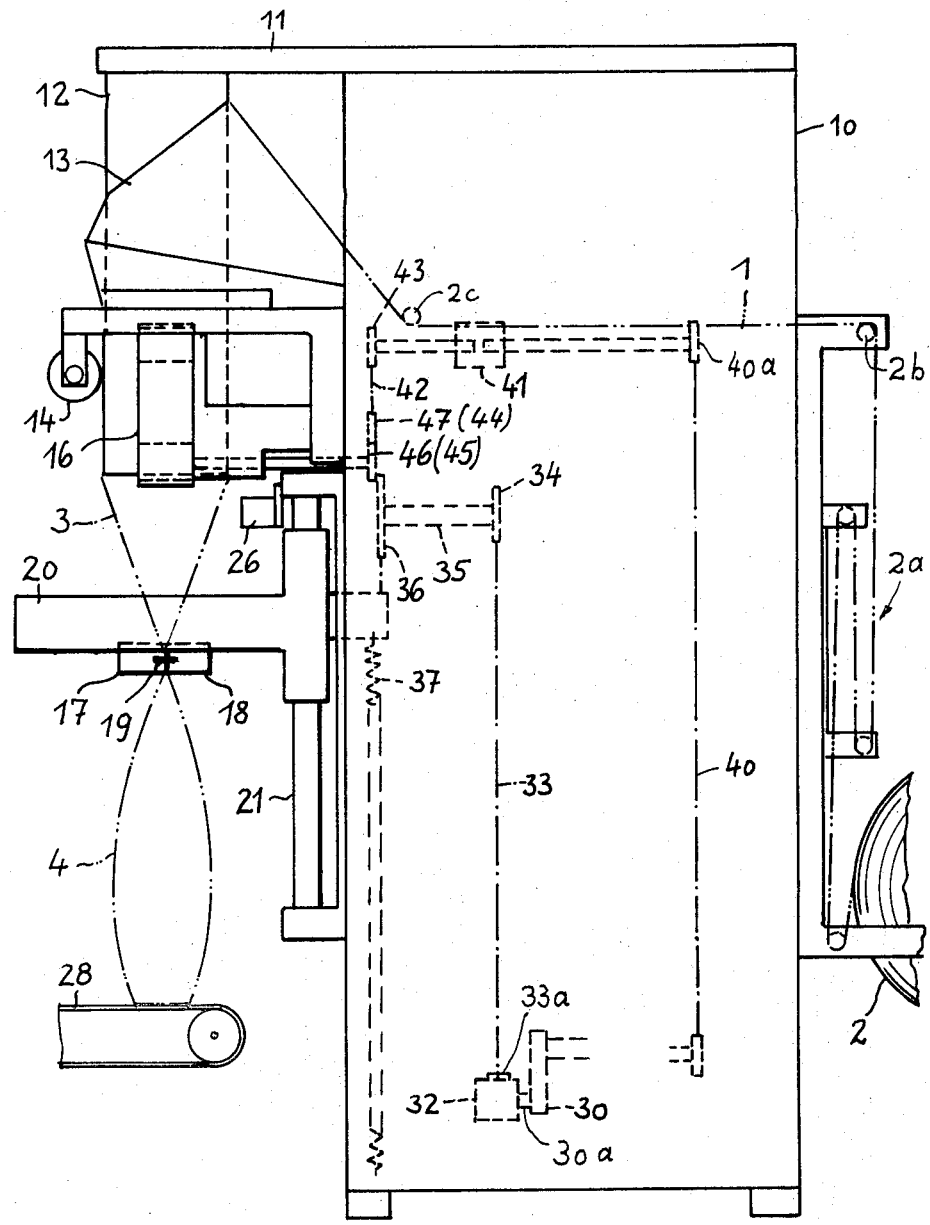
FIG. 1 is a fragmentary diagrammatic side elevational view of a bag making and filling apparatus which embodies the invention.
Figure 2:
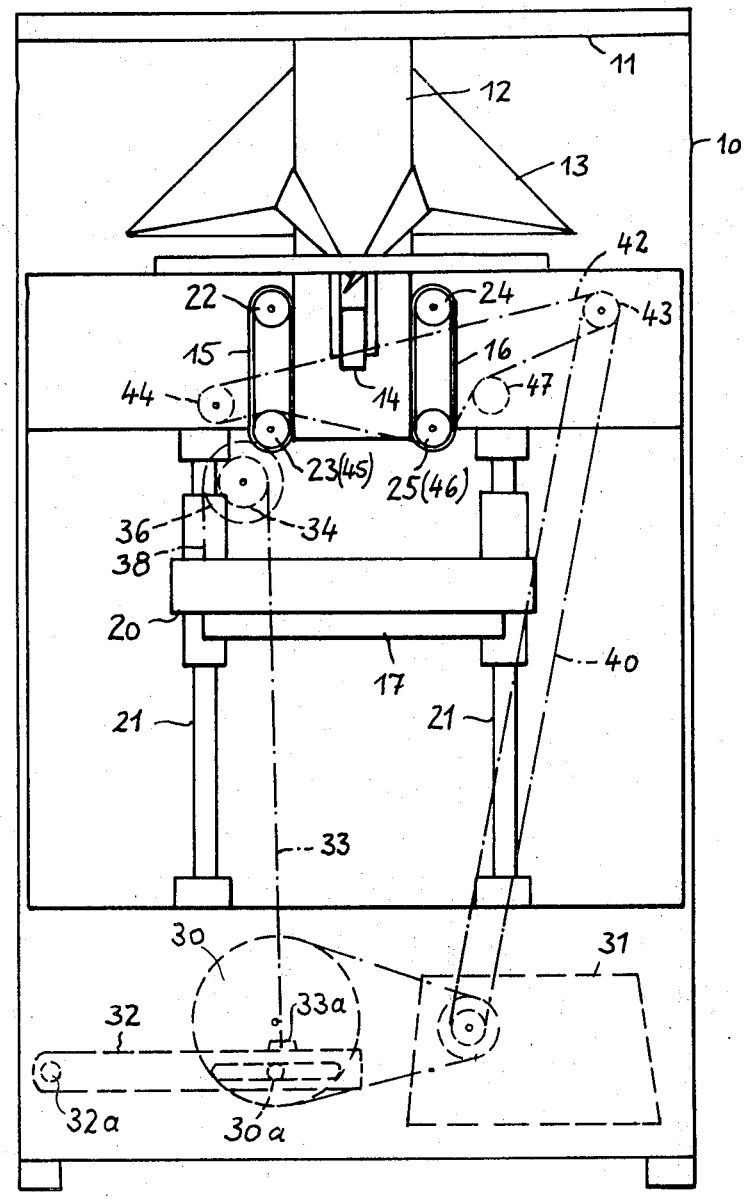
FIG. 2 is a front elevational view of the apparatus as seen from the left-hand side of FIG. 1.

The apparatus of FIGS. 1 and 2 comprises a frame or housing 10 which is provided at its upper end with a forwardly extending plate 11 supporting an upright hollow tubular mandrel 12 which constitutes the outlet of a feeding device for introducing metered quantities of a flowable liquid and/or solid material into successive bags 4. The upper portion of the tube 13 is partially surrounded by a draping member 13 (also called plow) which serves to convert a continuous web 1 into a tube surrounding the mandrel 12 and ready to be provided with a vertical seam. Such seam serves to sealingly secure the overlapping marginal portions of the draped web 1 to each other and is formed by a suitably heated roller-shaped welding electrode 14 which is adjacent to the external surface of the lower portion of the mandrel 12. The frame 10 supports at its rear side a roll 2 of convoluted web 1, and such web is threaded through a loop former 2a and passes over guide rolls 2b, 2c before it reaches the draping member 13. The web 1 may consist of or may be coated with a weldable or heat-sealable synthetic plastic material. The finished tube (which is provided with a longitudinally extending seam) is shown at 3. The parts 2, 2a–2c, 13 and 14 together constitute a means for supplying the web 1 to the mandrel 12 and for converting such web into the tube.

The apparatus further comprises combined welding and transporting means which serves to move the tube 3 in the longitudinal direction of the mandrel 12 and downwardly, as viewed in the drawing, as well as to convert the tube 3 into a succession of filled and sealed bags 4. The transporting means includes two endless conveyor bands or belt 15, 16 which are located diametrically opposite each other with respect to the axis of the tube 3 and are adjacent to the external surface of the mandrel 12 below the draping member 13. The transporting means further includes two horizontal welding electrodes 17, 18 which perform the additional function of providing longitudinally spaced portions of the tube 3 with pairs of transverse seams (not shown) to thus convert the tube 3 into a series of bags 4. (Such welding electrodes and their drive means are disclosed in U.S. Pat. No. 3,266,217 "Apparatus for hydraulic control of the transverse sealing jaws of a packaging machine.") The lower seam of each pair of seams is the top seam of a completely sealed bag 4 and the upper seam of such pair of seams is the bottom seam of the next-following bag 4. The endless belts 15, 16 are respectively trained over rollers 22, 23 and 24, 25 and the rollers 23, 25 are driven intermittently so as to advance the tube 3 downwardly in stepwise fashion whereby two successive downward movements of the inner stretches of the belts 15, 16 are separated from each other by an interval of predetermined duration. During such interval, the tube 3 is moved downwardly and is simultaneously sealed by welding electrodes 17, 18 which are mounted on a vertically reciprocable support or carriage 20. The latter is movable up and down along parallel vertical tie rods 21 and supports the welding electrodes 17, 18 for movement toward and away from each other whereby the electrodes engage and pinch the tube 3 in response to movement toward each other and are caused to move apart when the carriage or support 20 has completed a downward stroke. The arrangement is such that the electrodes 17, 18 move toward each other when the carriage 20 reassumes its starting or upper end position and move apart when the carriage 20 reaches its lower end position. The electrodes 17, 18 thereupon remain spaced apart while the carriage 20 moves upwardly back to the starting position so that the tube 3 can be transported downwardly by those stretches of the belts 15, 16 which are adjacent to the external surface of the mandrel 12. The mechanism which can move the electrodes 17, 18 toward and away from each other is of known design and therefore not shown in the drawing. The electrodes can be moved relative to the carriage by an electromagnet, a chain or belt drive, a rack and pinion drive or any other suitable means.

One of the electrodes 17, 18 is provided with a knife 19 or an analogous severing device which cuts across the tube 3 between a pair of freshly formed tansverse seams when the carriage 20 reaches the lower end of its stroke to thereby separate a completely sealed and filled bag 4 from the lower end portion of the remainder of the tube; such filled and sealed bag 4 can descend onto a take-off conveyor 28 for transport into storage or a carton filling machine, not shown.

FIG. 1 illustrates the carriage 20 at the upper end of its stroke (i.e., in its starting position) and the electrodes 17, 18 in positions of engagement with the tube 3. The carriage 20 is thereupon caused to move downwardly while the electrodes 16, 17 provide the tube 3 with a pair of transverse seams so that the formation of seams is completed when the carriage 20 reaches the lower end of its stroke. The belts 15, 16 are set in motion in response to transmission of torque to the rollers 23, 25 as soon as the carriage 20 reaches its lower end position, and the welding electrodes 17, 18 are moved apart to allow for further downward transport of the tube 3. The belts 15, 16 are arrested when the lengthwise transport of tube 3 by the length of a bag 4 is completed. Such transport is started by the electrodes 17, 18 and terminated by the belts 15, 16. The downward movements of the tube 3 are monitored by a suitable photoelectric detector 26 which scans the tube 3 below the belts 15, 16 and can furnish a signal which causes the drive means for the belts 15, 16 to terminate the transmission of torque to rollers 23, 25. The carriage 20 returns to its upper end position while the tube 3 is being transported by the belts 15, 16 to thus insure that the tube 3 can be advanced again as soon as the electrodes 17, 18 complete their movement relative to the carriage 20 and toward each other in order to engage and seal the portion of the tube therebetween.

The mandrel 12 discharges into the sealed lower end of the tube 3 a metered quantity of flowable material while the tube 3 is in motion toward the conveyor 28. As mentioned above, the conveyor 28 intercepts successive finished and filled bags 4 and transports them away from the space below the carriage 20.

The mechanism for moving the carriage 20 up and down comprises a crank arm or disc 30 which is driven by an electric motor or another suitable prime mover (not shown) through the intermediary of a variable-speed transmission 31. The eccentric pin 30a of the member 30 extends into an elongated slot provided in a stroke adjusting lever 32 which is pivotable in the frame 10, as at 32a, and is connected with the lower end of a chain 33 of finite length. The upper end portion of the chain 33 is trained over and secured to a sprocket wheel 34 which is coaxially secured to a larger sprocket wheel 36 by a shaft 35. The point of connection between the stroke adjusting lever 32 and the lower end portion of the chain 33 (such point is shown at 33a) is adjustable in the longitudinal direction of the lever 32 to thereby select the length of downward and upward strokes of the carriage 20. The sprocket wheel 36 is connected with the upper end portion of a second chain 38 which is trained in part over the sprocket wheel 36 and the lower end of which is attached to the carriage 20. A helical spring 37 is connected to the frame 10 and serves to bias the carriage 20 downwardly. When the transmission 31 causes the member 30 to orbit the pin 30a, the lever 32 pivots back and forth and cooperates with the spring 37 to move the carraige 20 up and down through strokes whose length is determined by selected distance of the point 33a from the pivot 32a for the lever 32.

The transmission 31 of the drive means for the carriage 20 further serves to intermittently rotate the rollers 23, 25 for the conveyor belts 15 and 16. To this end, the transmission 31 drives an endless chain or belt 40 which drives a second chain 42 by way of a sprocket wheel 40a, a combined clutch and braking device 41 and a further sprocket wheel 43 which is intermittently driven by the device 41. (Such a clutch brake unit is a product of Zahnradfabrik Friedrichshafen AG, Germany, and available under the type EK . . . B.) The chain 42 is further trained over a sprocket wheel 44, a sprocket wheel 45 which drives the roller 23 for the conveyor belt 15, a sprocket wheel 46 which drives the roller 25 for the conveyor belt 16, and a sprocket wheel 47. When the device 41 is energized and transmits torque from the sprocket wheel 40a to the sprocket wheel 43, the rollers 23 and 25 drive the belts 15 and 16 in directions to move the tube 3 downwardly. The signals for denergization of the device 41 can be furnished by the detector 26. The signals for energization of the device 41 can be furnished by a suitable limit switch (not shown) which can be actuated in response to movement of the welding electrodes 17, 18 away from each other when the carriage 20 reaches the lower end of its stroke. As mentioned above, downward movement of the carriage 20 is started when the electrodes 17, 18 engage the tube 3 and when the belts 15, 16 are at a standstill (during each interval of idleness of the belts 15, 16) to thus insure that the tube 3 is moved practically continuously, either by the endless external surfaces of belts 15, 16 or by the electrodes 17, 18. This contributes to a higher output of the apparatus. If desired, the device 41 can be energized in direct response to completion of downward movement of the carriage 20 and deenergized in direct response to completion of upward movement of the carriage. This device 41 is further capable of automatically braking the sprocket wheel 43 to thus interrupt the movement of chain 42 in immediate response to termination of torque transmission to the sprocket wheel 43.

It is further clear that each of the conveyor belts 15, 16 can be replaced by one or more intermittently driven rollers which cooperate with the external surface of the mandrel 12 to move the tube 3 downwardly while the carriage 20 moves upwardly. Such rollers can be driven in the same or analogous way as the belts 15, 16. It is also clear that the illustrated drive means for the belts 15, 16 or rollers and carriage 20 can be replaced by other types of drive means, as long as the drive means is capable of moving the tube by way of one or more conveyors while the electrodes 17, 18 move back to their starting positions and thereupon by way of the electrodes while the electrodes provide the tube with one or more transverse seams.

It is possible to select the stroke of the carriage 20 in such a way that the tube 3 is moved downwardly by the electrodes 17, 18 through distances or steps each of which equals one-half the length of a bag 4, and that the belts 15, 16 transport the tube 3 through distances each of which equals that covered by the electrodes 17, 18 while moving downwardly and while being in engagement with the tube. The duration of engagement of the tube with the electrodes 17, 18 can be selected practically at will and, therefore, the operator can readily select such duration with a view to insuring the formation of highly satisfactory transverse seams but without any charring or overheating of the material of the tube. Furthermore, and since the mandrel 12 can admit flowable material while the tube 3 is being transported by the belt 15, 16, at least the lower end portion of the tube can be completely filled while the electrodes 17, 18 move upwardly so that, if desired or necessary, each bag 4 can be filled to capacity. The introduction of flowable material can continue while the tube 3 moves downwardly with the electrodes 17 and 18. The adjustability of the chain 33 relative to the lever 32 renders it possible to use the apparatus for the making of longer, shorter or medium-sized bags whereby the selected length of the bags may vary within a very wide range. The periods of idleness of the tube 3 are extremely short so that the apparatus is capable of turning out a large number of bags 4 per unit of time. The tube 3 is normally idle for an extremely short interval of time when the belts 15, 16 are arrested and again for a very short period of time when the carriage 20 reaches the lower end of its stroke.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence to the claims.

What is claimed as new and desired to be protected by Letters Patent is set forth in the appended claims:

1. In an apparatus for forming and filling bags consisting at least in part of weldable material, a combination comprising an elongated mandrel; means for supplying to said mandrel a web of weldable material and for converting such material into a tube which surrounds said mandrel; conveyor means outwardly adjacent to said mandrel and operative to transport the tube lengthwise of said mandrel in a predetermined direction and in stepwise fashion by a first distance corresponding to only part of the length of a bag which is being formed, with an interval of predetermined duration between each pair of successive lengthwise movements of the tube under the action of said conveyor means; and combined welding and transporting means for welding said tube and transporting it by a second distance corresponding to the remainder of the length of the bag being formed, including a plurality of welding elements movable toward and away from each other transversely of the path of the tube to provide the tube with at least one transverse seam in response to movement toward each other, and means for moving said welding elements in said direction through said second distance during said intervals and while the welding elements engage the tube so that the tube shares such movements of said elements.

2. A combination as defined in claim 1, wherein said mandrel constitutes the outlet of a device for feeding into the tube measured quantities of a flowable material at least while the tube is being moved by said conveyor means.

3. A combination as defined in claim 1, wherein said means for moving said welding elements comprises a support on which said elements are movable toward and away from each other, and means for moving said support in said direction during each of said intervals and counter to said direction while the tube is being moved by said conveyor means and while said welding elements are disengaged from the tube.

4. A combination as defined in claim 1, wherein said conveyor means comprises a plurality of belts having elongated tube-engaging stretches extending in parallelism with the longitudinal direction of said mandrel.

5. A combination as defined in claim 1, wherein said conveyor means comprises a plurality of intermittently driven conveying members having endless tube-engaging surfaces.

6. A combination as defined in claim 1, wherein said welding elements comprise means for severing the tube to thus separate from the tube a succession of sealed bags.

7. A combination as defined in claim 6, wherein said conveyor means is arranged to advance the tube upon separation of a sealed bag and said elements are arranged to advance the tube prior to separation of a bag.

8. A combination as defined in claim 1, wherein said conveyor means is located at a level above said welding elements.

9. A combination as defined in claim 1, further comprising means for adjusting the extent of movement of said welding elements in said direction.

10. A combination as defined in claim 1, wherein said first mentioned means comprises a device for draping the web around said mandrel so that the marginal portions of the thus draped web are adjacent to each other, and electrode means for sealing said marginal portions to each other.

11. A combination as defined in claim 1, wherein said welding elements are arranged to provide longitudinally spaced portions of the tube with pairs of parallel transverse seams and include means for severing the tube between the seams of each of said pairs of seams.

12. In a packaging apparatus wherein a tube is formed from web material and from which tube sections may be transversely sealed and severed to provide a succession of packages of predetermined length; a combination comprising an elongated tube former for producing from said web material a tube, and tube advancing means having first and second conveyor means, said first conveyor means having a clamp with gripping and sealing means for repeatedly engaging and pulling away from said tube former the formed tube and being reciprocated toward and away axially from said tube former only through an amplitude shorter than the predetermined package length, said second conveyor means being outwardly adjacent to said tube former and operative to advance said tube only by the remainder of the predetermined package length after the clamp has disengaged the tube.

* * * * *